H. K. ALTICK.
AUTOMATIC GEAR SHIFT FOR AUTOMOBILES.
APPLICATION FILED MAR. 26, 1917.
1,346,151.
Patented July 13, 1920.
6 SHEETS—SHEET 6.
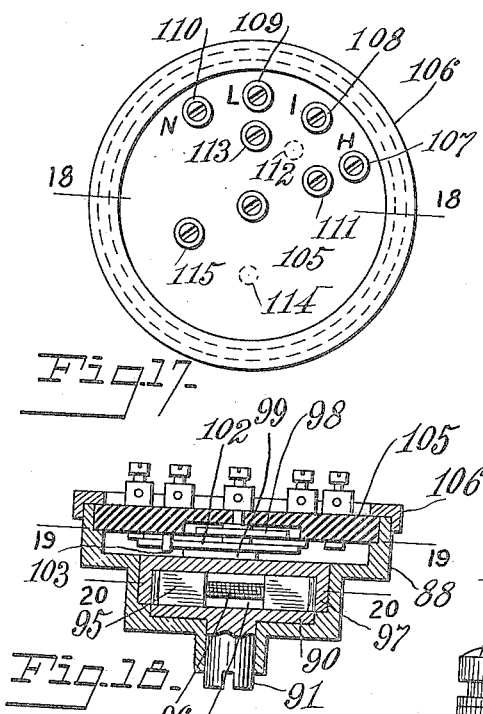
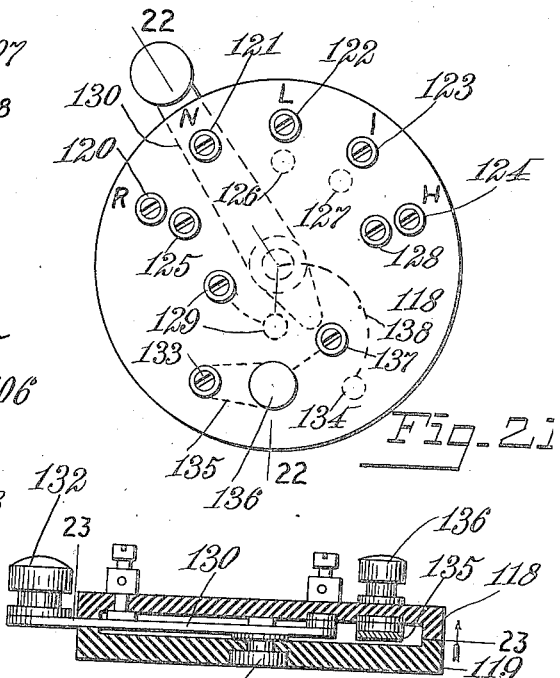
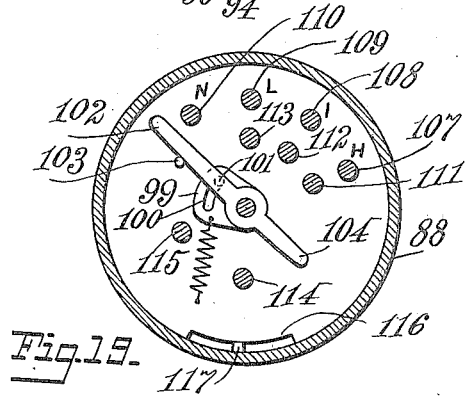
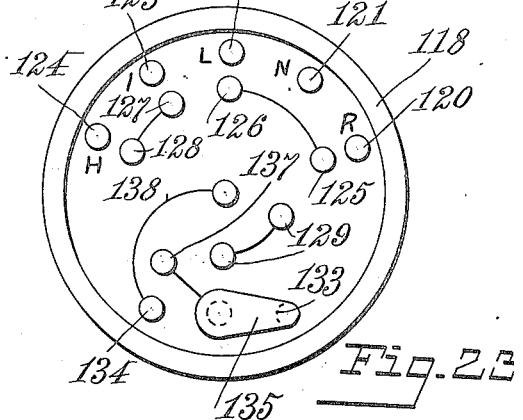
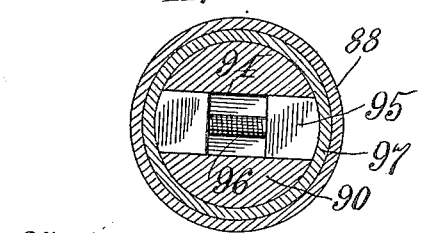

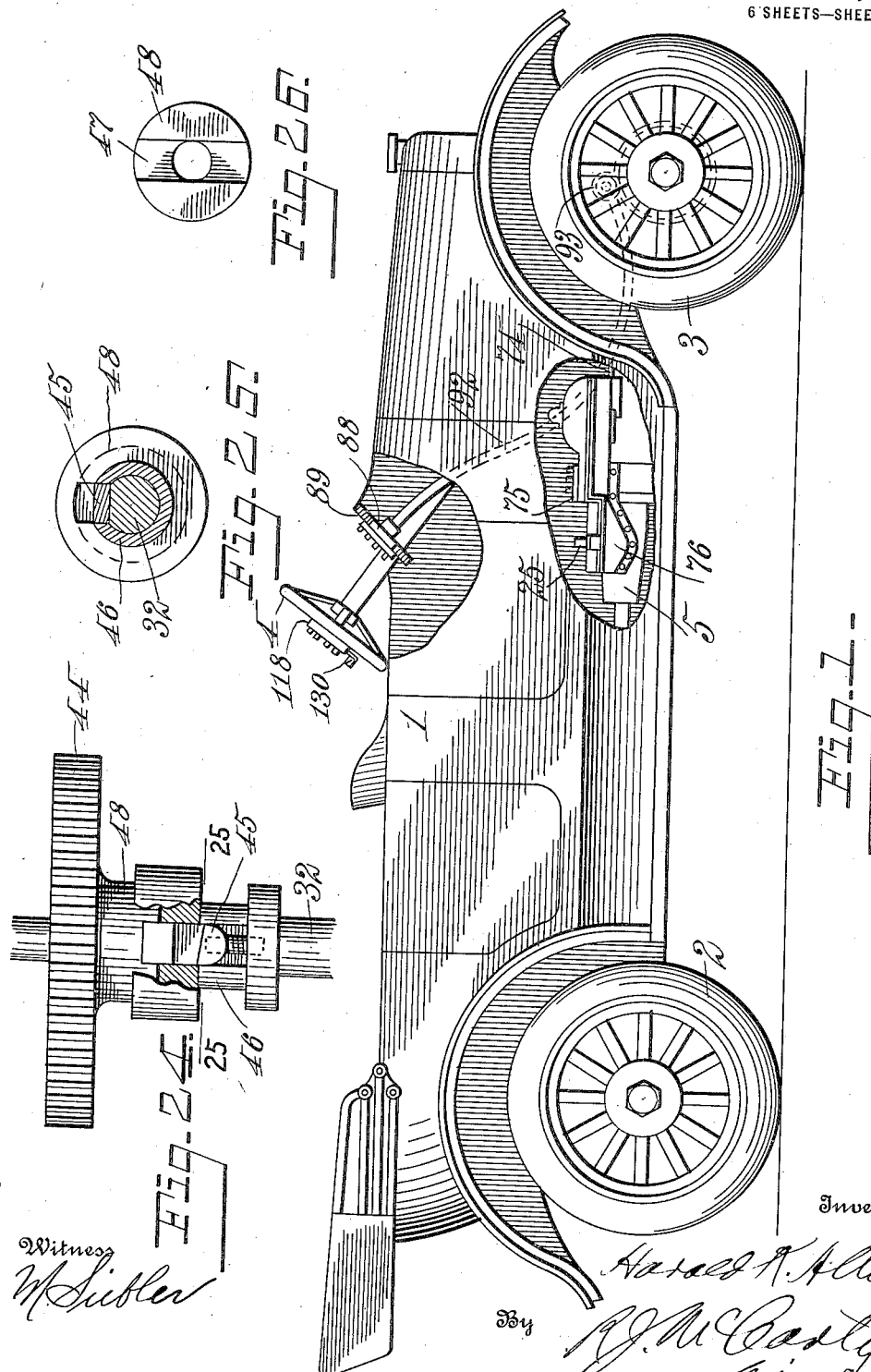

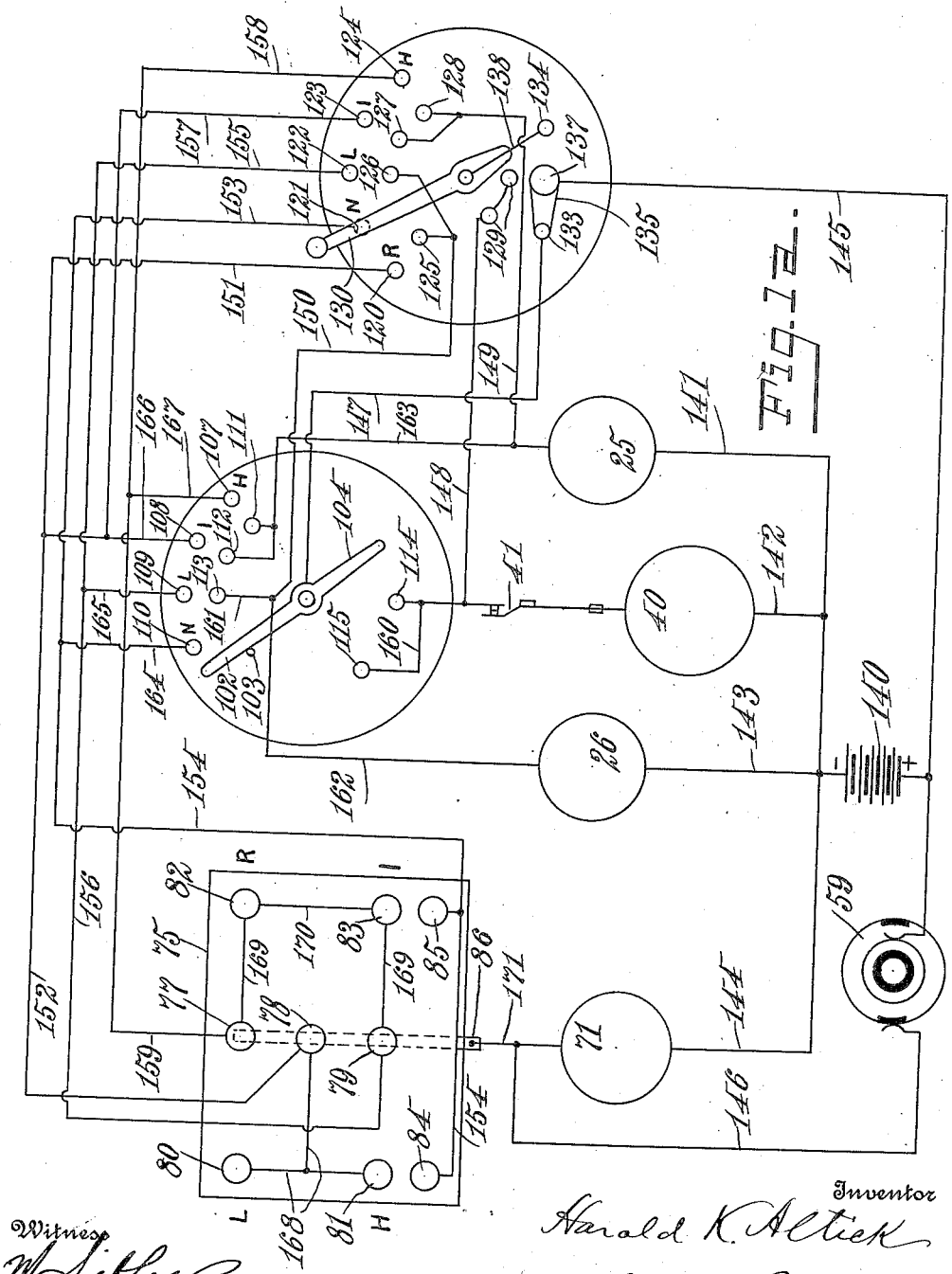

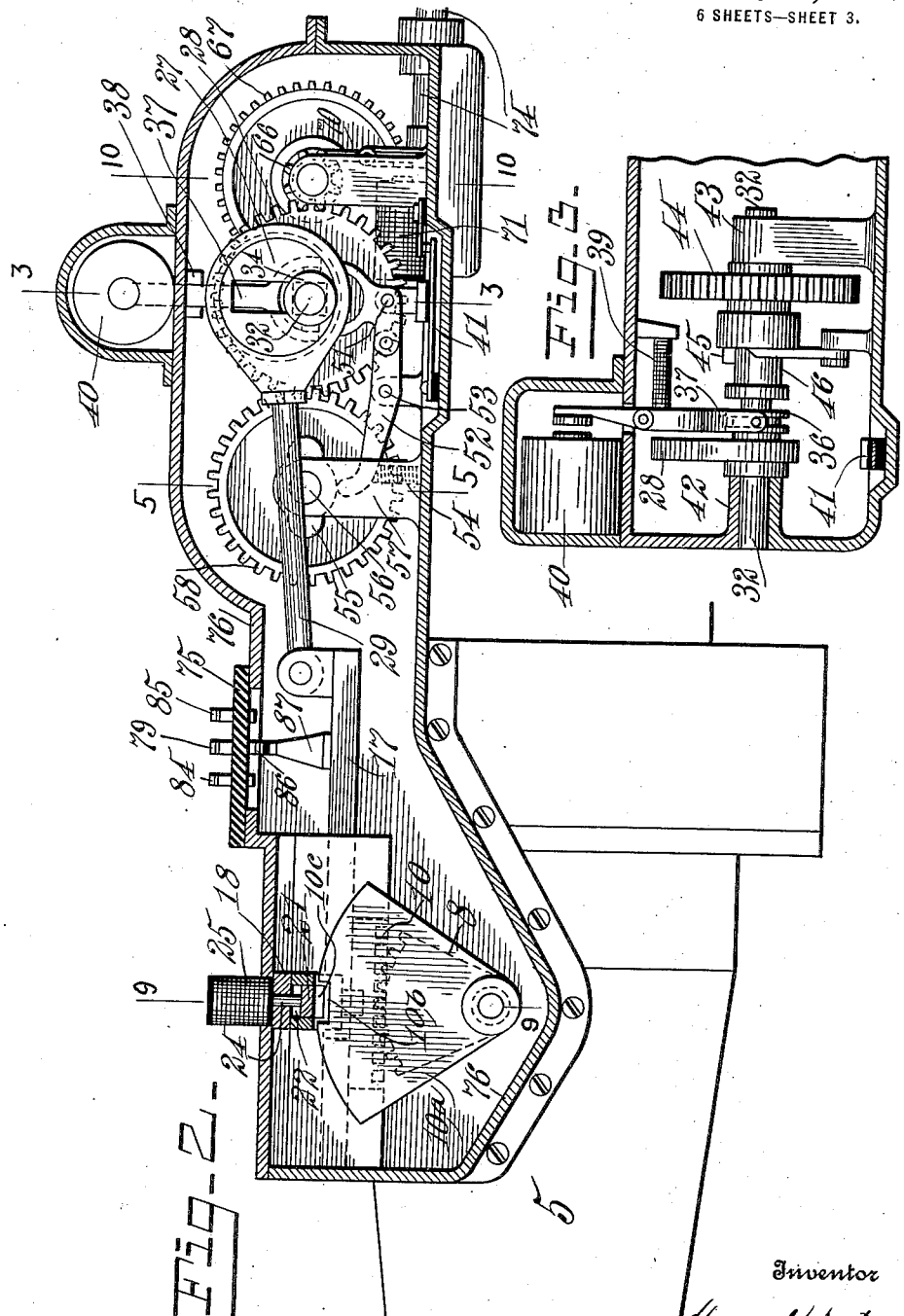

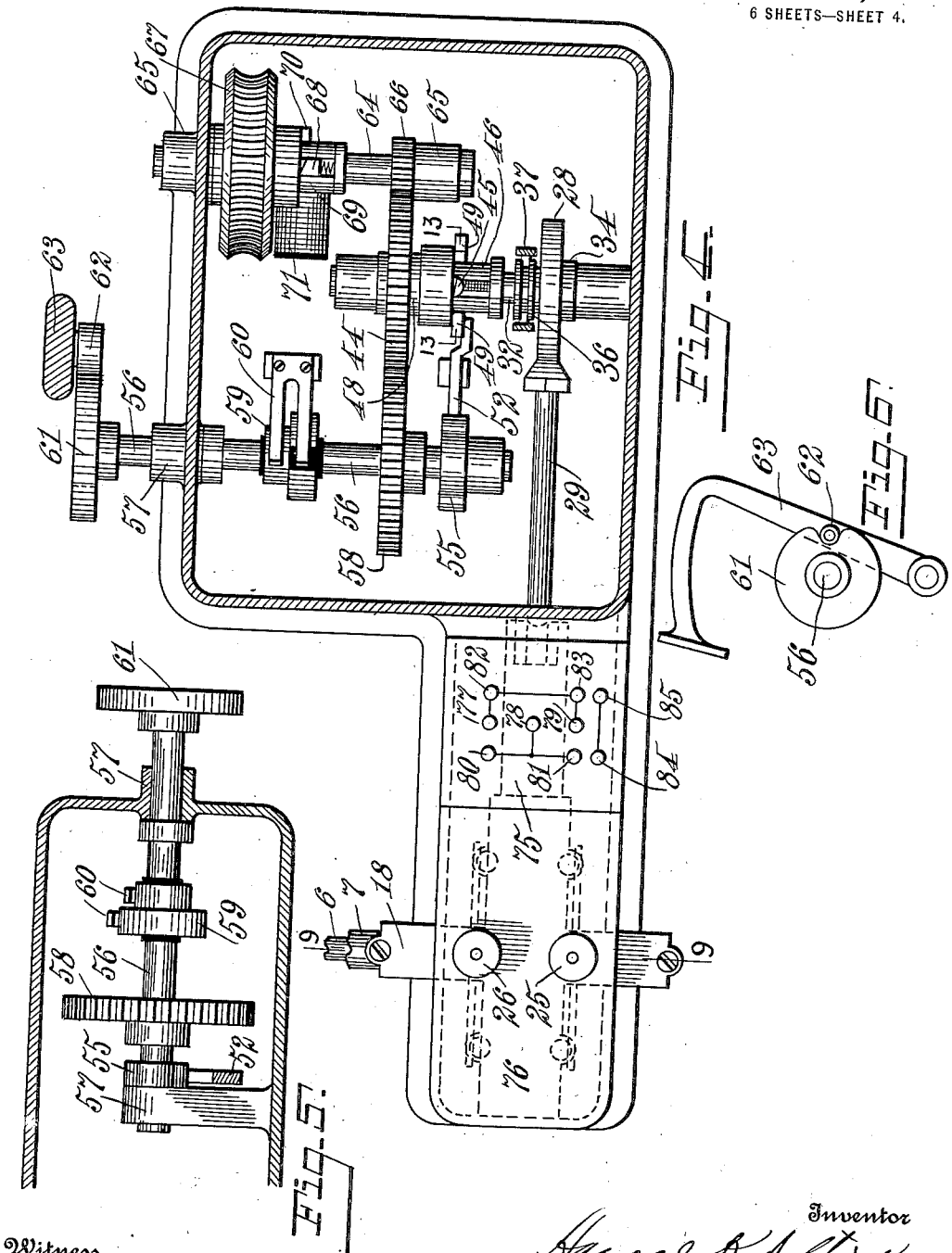

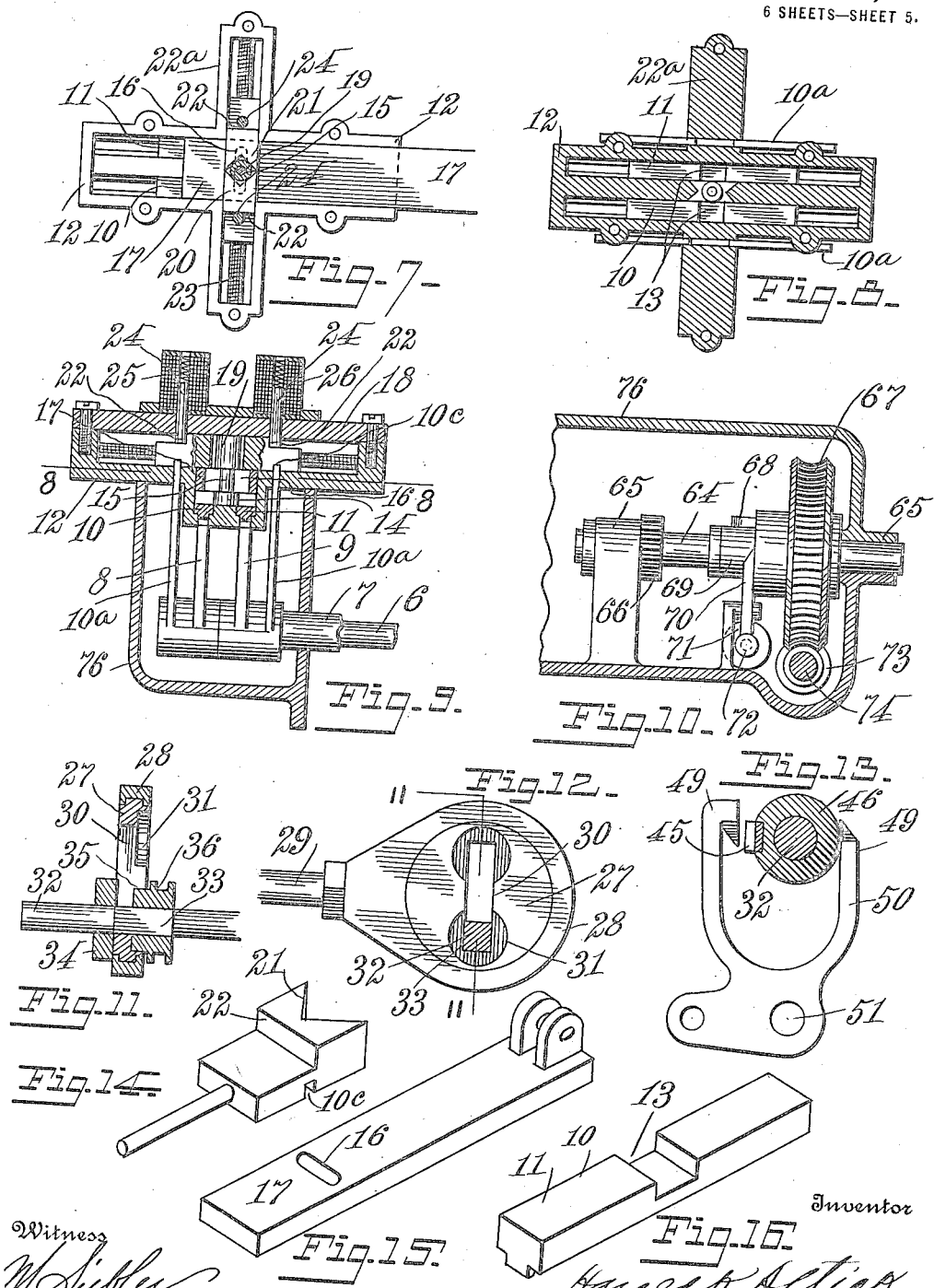

UNITED STATES PATENT OFFICE.

HAROLD K. ALTICK, OF DAYTON, OHIO.

AUTOMATIC GEAR-SHIFT FOR AUTOMOBILES.

1,346,151.

Specification of Letters Patent. Patented July 13, 1920.

Application filed March 26, 1917. Serial No. 157,472.

*To all whom it may concern:*

Be it known that I, HAROLD K. ALTICK, citizen of the United States, residing at Dayton, in the county of Montgomery and State of Ohio, have invented certain new and useful Improvements in Automatic Gear-Shifts for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an electrically selective and speed controlled automatic gear shift for the transmission gears of automobiles. The primary object of the invention is to provide means whereby the transmission gears are shifted by the same power which drives the automobile and commensurate with and controlled by the speed of the automobile. A further object of the invention is to provide electrical and automatic mechanical means for dispensing with manual labor in shifting the transmission gears of an automobile. A further object of the invention is to provide means whereby an electrical gear shift may be operated either selectively or automatically. These and other objects will appear in the description to follow.

In advance of a general description of my invention, reference is made to the accompanying drawings. Figure 1 thereof is a side elevation with parts broken away of an automobile equipped with my invention. Fig. 1ᵃ is a diagrammatic view of the electrical connections. Fig. 2 is a side elevation of the gear shifting mechanism with the casing shown in section. Fig. 3 is a section on the line 3—3 of Fig. 2. Fig. 4 is a top plan view of the gear shifting means with the casing shown in section. Fig. 5 is a section on the line 5—5 of Fig. 2. Fig. 6 is a detail view of the service clutch lever and cam which release the clutch of the automobile during the time the gears are being shifted. Fig. 7 is a top plan view of the cams, shifter plate and racks which shift the transmission gears, with the cover plate removed. Fig. 8 is a similar view of the same, being a section on the line 8—8 of Fig. 9. Fig. 9 is a section on the line 9—9 of Fig. 2. Fig. 10 is a section on the line 10—10 of Fig. 2. Fig. 11 is a section on the line 11—11 of Fig. 12. Fig. 12 is a detail view of the eccentric operating means. Fig. 13 is a section on the line 13—13 of Fig. 4, the same being a detail view of the actuating means for one of the clutches. Fig. 14 is a detail perspective view of one of the cams for controlling the shifting of the gears. Fig. 15 is a detail perspective view of a plate or actuator which shifts the gears. Fig. 16 is a detail perspective view of one of the gear shifting racks. Fig. 17 is a top plan view of the governor. Fig. 18 is a section on the line 18—18 of Fig. 17. Fig. 19 is a section on the line 19—19 of Fig. 18. Fig. 20 is a section on the line 20—20 of Fig. 18. Fig. 21 is a top plan view of the controller. Fig. 22 is a section on the line 22—22 of Fig. 21. Fig. 23 is a view of the switch points of the controller, the same being on the line 23—23 of Fig. 22. Fig. 24 (Sheet 1) is a detail view of one of the clutches. Fig. 25 (Sheet 1) is a section on the line 25—25 of Fig. 24. Fig. 26 is a detail view of the clutch hub of the gears shown in Fig. 24.

Throughout the specification and drawings, similar reference characters indicate corresponding parts. Referring more particularly to the drawings, 1 represents an automobile provided with the usual rear wheels 2, front wheels 3, steering wheel 4, and a transmission gear 5. The transmission gear 5 is of a well known gear shift type and is provided with two telescopic shafts 6 and 7. (See Figs. 4 and 9). The present gear shift and its actuating mechanism are adapted to be used in connection with the transmission gear, having three speeds forward and reverse, which are designated throughout the present specification and drawings by the initials L, I, H, and R., meaning thereby "low", "intermediate", "high" and "reverse". The shafts 6 and 7, as is well known, oscillate in either direction from a neutral position to shift the transmission gears, one shaft actuating the gears for the low and reverse position, while the other shaft actuates the gears for the high and intermediate positions. The shafts 6 and 7 in the present instance are oscillated by segment gears 8 and 9 which are in mesh with racks 10 and 11 slidingly mounted in a housing 12. The housing 12 is provided with a cover plate 18. The racks 10 and 11 are provided with recesses 13 which are adapted to receive a roller 14 on the lower end of a pin 15 which passes through a slot 16 in a shifting plate 17. (Figs. 7 and 9). The shifting plate 17 is slidingly mounted in the housing 12 and reciprocates beneath the cover plate 18. The upper end of the pin 15 is provided with a roller 19 in operative relation with two V-shaped cams 20 and 21. (Fig. 14). The cams 20 and 21 reciprocate in extensions 22ª of the housing 12 and are under the influence of springs 23. The said cams 20 and 21 are provided with shoulders 22 which are engaged by plungers 24 of magnets 25 and 26. When either one of the magnets 25 and 26 is energized it disengages its respective plunger 24 from the shoulder 22 of its respective cam 20 or 21. When the shifting plate 17 is then reciprocated, the roller 19 which lies within the V-shaped recesses of the cams will be shifted laterally by the cam held stationary by its respective plunger 24, thereby shifting the roller 14 into one of the recesses 13 of the racks 10 or 11. The continued movement of the plate 17 will shift the selected rack 10 or 11. It will be noted that by shifting the plate 17 in either direction and by energizing either one of the magnets 25 or 26, one or the other of the shafts 6 or 7 may be oscillated in either direction, thereby selecting the transmission gear to be shifted. When either of the cams 20 or 21 is actuated, the other cam will be locked in position by one of two segments 10ª which segments are attached to respective segment gears 8 and 9. (Fig. 9). The segments 10ª are provided with recesses 10ᵇ (Fig. 2) which, when in a normal position permits the cams to be actuated. The segments 10ª lock the cams by passing into recesses 10ᶜ in the cams. The plate 17 is shifted through the agency of an eccentric 27 provided with a strap 28 pivotally connected to the plate 17 by a rod 29. (Figs. 11 and 12). The eccentric 27 is provided with a slot 30 having pockets 31 at each end thereof. The slot 30 receives a shaft 32 having a square portion 33 adjacent to the eccentric. The said slot 30 permits the eccentric 27 to reciprocate from one to the other. The eccentric 27 is held from the shaft 32 by a collar 34 and a shiftable boss 35 which is adapted to enter the pockets 31. The boss 35 is provided with a peripheral groove, a race 36 which coöperates with a lever 37 pivoted at 38 and under the control of a spring 39 and an electro-magnet 40. (Fig. 3.) Whenever the electro-magnet 40 is energized, the boss 35 is disengaged from the eccentric 27 thereby permitting the eccentric to fall by gravity or any force acting thereon, which places the eccentric 27 in a position the same as it would be in if the shaft 32 had made one-half a revolution. When the eccentric 27 thus falls by gravity or otherwise, the lower side of the strap 28 engages and opens the electrical switch 41, which together with the magnets above referred to, will be hereinafter described more in detail. The shaft 32 is journaled in suitable bearings 42 and 43 and is adapted to be connected to a gear 44 freely mounted on the shaft 32 by a clutch consisting of a spring-controlled member 45 slidingly mounted in a collar 46 and adapted to pass into recesses 47 in the hub 48 of the gear 44. (See Figs. 24, 25 and 26, Sheet 1). The clutch member 45 is adapted to be disengaged from the hub 48 of the gear by engaging members 49 of a shift yoke 50 pivoted at 51 and actuated by a lever 52 pivoted at 53 and under the control of a spring 54 and a cam 55. (Figs. 4, 5 and 13.) The cam 55 is mounted upon a shaft 56 journaled in bearings 57. The shaft 56 is provided with a gear 58 in mesh with a gear 44. The gears 44 and 58 are of the same size, thus enabling the shafts 32 and 56 to rotate at the same speed. The shaft 56 is provided with an electrical switch 59 having brushes 60 and two circuit-breaking points. This switch will be again referred to. The shaft 56 is also provided with a cam 61 in operative relation with a roller 62 on the "service clutch lever" 63. (Figs. 4 and 6). The function of the cam 61 is to disengage the service clutch of the automobile when the gears are being shifted, as is the practice in the driving of automobiles. However, in the present instance, it is performed automatically instead of manually as on automobiles not provided with my invention. The cam 61 (Fig. 6) is provided with a dwell surface and is so timed that after the service clutch is thrown out the transmission gears of the automobile will have time to come to the proper speed before they are shifted and placed in mesh, thus permitting the gears to properly and noiselessly inter-mesh. The shafts 32 and 56 are driven from a shaft 64 journaled in suitable bearings 65 and provided with a pinion 66 which meshes with the gear 44. The ratio of the gears 66 to the gears 44 and 58 is four to one, thereby permitting the shaft 64 to make four revolutions to one revolution of the shafts 32 and 56. The shaft 64 is adapted to be clutched to a worm gear 67 by a spring-controlled starting clutch member 68 slidingly mounted on a collar 69 and adapted to engage the hub of the gear 67 in a manner similar to or identical with the clutch of the gear 44 shown in Fig. 24. The clutch member 68 is disengaged from the gear 67 by a lever 70 under the control of a magnet 71 and a spring 72 which in the present instance lies within the core of the magnet. (Figs. 4 and 10). The worm gear 67 is in mesh with a worm 73 mounted upon a shaft 74. The shaft 74 is connected to and driven by any moving part of the engine of the automobile or any other applied power. It will be seen from the above description that, when the various magnets are electrically influenced and the various clutch mechanisms are actuated, the shifting plate 17 will, through the train of gearing above described, be actuated from the automobile engine, or other applied power as the case may be, to shift the racks 10 and 11 to oscillate the shafts 6 and 7 and to thereby shift the gears of the transmission gear. These various functions are performed manually and automatically by an electrically-connected controller, governor, and distributer, to which reference is now made. The distributer, which will be described first, (Figs. 1, 1ª, 2, 4) consists of an insulating plate 75 mounted upon a casing 76 and provided with terminal points 77, 78 and 79, which represent the neutral position of the gear shifting means. The plate 75 is also provided with terminals 80 and 81 which represent the "low" and "high" positions of the gear shifting means, while the terminals 82 and 83 on said plate 75 represent the "reverse" and "intermediate" positions of the gear shifting means. The plate 75 is also provided with terminals 84 and 85 which are instrumental in moving the gear shifting means to a neutral position, as will be more particularly described hereinafter. The terminals on the plate 75 extend through the plate and are adapted to be wiped by an elongated reciprocating brush 86 mounted upon an insulated bracket 87 supported upon the shifting plate 17. When the gear shifting plate 17 is in a "neutral" position the brush 86 is in contact with the points 77, 78, and 79. When the plate 17 has been shifted to a "low" or "high" position, the brush 86 is in contact with the points 80, 81, and 84, and when said plate 17 has been moved to a "reverse" or "intermediate" position, the brush 86 is in contact with the points 82, 83 and 85. The governor consists of a series of electrical switches adapted to be opened and closed by a speed controlled means driven from the moving car, and is constructed in detail as follows. (Figs. 1, 18, 19, 20). The governor consists of a casing 88 mounted in the present instance in the instrument board 89 of the automobile. Mounted within the casing 88 is a revolving member 90 provided with a stub shaft 91 adapted to be connected to a front wheel 3 of the automobile by a flexible shaft 92 and gears 93. The rotating member 90 is therefore driven by the front wheels of the automobile and the speed thereof will be commensurate with the speed of the vehicle, as it travels over the ground. The rotating member 90 is provided with a pocket 94 which receives friction members 95 adapted to be pressed outwardly by an intermediate spring 96 and the centrifugal force generated by the revolving member 90. The members 95 are in frictional engagement with a cup 97 mounted in the housing 88. As the speed of the member 90 increases or decreases, the frictional contact between the members 95 and the cup 97 will correspondingly increase or decrease, thereby increasing or decreasing the force tending to rotate the cup 97. This frictional resistance moves the cup 97 in one direction while a spiral spring 98 of a well known form is provided to return said cup to a normal position when the speed of the car decreases. The equilibrium between the frictional force of the members 95 and the force of the spring 98 will therefore hold the cup 97 in a position, relative to a normal position, commensurate with the speed of the car or moving vehicle. This construction is a well known type of actuating means for speedometers, which, as far as my invention is concerned, may be of any well known type. The electrical switches operated by the speed-governed means in the present instance may be an integral part of the speedometer of an automobile. The cup 97 is provided with a plate 99 having a slot 100 which receives a pin 101 on a brush 102. The purpose of the slot is to permit the brush to fluctuate slightly without actuating the various instrumentalities. The brush 102 is moved to and held in a normal position against a pin 103 by the spring 98 before referred to. The brush 102 is provided with a brush extension 104. (Fig. 19). Mounted above the brush 102 and extension 104 is an insulating cover 105 held within the casing 88 by a ring or flange 106. The cover 105 is provided with an outer series of contact points and terminals 107, 108, 109, and 110, corresponding to the "high", "intermediate", "low" and "neutral" positions of the transmission gear. The cover 105 is also provided with an inner series of contact points 111, 112, 113, corresponding to the "high", "intermediate" and "low" positions. The contact points above referred to are adapted to be engaged by the brush 102, while the contact point 104 is adapted to engage contact points 114 and 115 corresponding to the "low" and "high" positions of the transmission gear. The cover 105 is provided with a recess 116 in which rests a lug 117 extending from the casing 88. (Fig. 19). This recess 116, when the ring 106 is released, permits the cover 105 to be oscillated to adjust the timing of the automatic gear shifting means. The gear shifting means as a whole is placed in operation and is operated "selectively" by a controller shown in Figs. 21 and 23. The controller consists of upper and lower members 118 and 119 which are mounted upon or adjacent to the steering wheel 4 as shown in Fig. 1. The upper member 118 is provided with an outer series of terminals and contact points 120, 121, 122, 123, and 124, corresponding to the "reverse", "neutral", "low", "intermediate" and "high" positions of the transmission gear. The plate 119 is provided with an inner series of terminal and contact points 125, 126, 127 and 128, corresponding to the "reverse", "low", "intermediate" and "high" positions of the transmission gear. It will be noted that in the inner series, the contact points of the "reverse" and "low" positions have the same terminal connection, as is also true of the "high" and "intermediate" positions. The plate 118 is also provided with contact points 129 opposite the "low" and "high" positions. The contact points above referred to on the plate 118 are adapted to be engaged by a swinging arm 130 pivoted at the center at 131 and provided with a finger button 132 by means of which it may be shifted. The plate 118 of the controller is also provided with two contact points 133 and 134 adapted to be engaged by a switch 135 provided with a finger button 136 and a terminal point 137. The terminal point 134 is electrically connected by a wire 138 to the swinging arm 130, while the contact point 133 is connected to the various instrumentalities outside of the controller. The function of the switch 135 is to select the mode of operation of the gear shifting means, either "entirely automatically" or "individually selective". When the switch 135 is in contact with the point 133 the gear shifting means is actuated "entirely automatically", but when in contact with 134 the various positions of the transmission gears may be selected individually and independently.

*Electrical connections.*

The various electrical instrumentalities are supplied with current from any source of electrical energy, such as a battery 140. (Fig. 1ª). The negative side of the battery 140 is connected to the magnet 25 by a wire 141; with the magnet 40 by a wire 142; with the magnet 26 by a wire 143, and with the magnet 71 by a wire 144. The positive side of the battery is connected to the switch 135 of the controller by a wire 145. The positive side of the battery is also connected to the magnet 71 by a wire 146, which, together with the wire 144, forms a complete circuit through the magnet 71 and battery 140. The switch 59 before referred to is connected into a wire 146, the object of the switch 59 being to maintain the magnet 71 energized while the brush 86 is disconnected from the terminal points on the plate 75 of the distributer. The terminal point 133 of the switch 135 is connected to the brushes 102 and 104 of the governor by a wire 147. The terminal point 134 of the switch 135 is connected to the arm 130 of the controller by wire 138 as before stated. The terminal point 129 of the controller is connected to battery 140 through a wire 148 and a switch 41. "Intermediate" and "high" terminal points 127 and 128 are connected to magnet 25 by a wire 149. The "reverse" and "low" terminal points 125 and 126 of the controller are connected to the magnet 26 by wires 150 and 162. The "reverse" terminal point 120 of the controller is connected to the "neutral" terminal point 78 of the distributer through wires 151 and 152. The "neutral" terminal point 121 of the controller is connected to the terminal points 84 and 85 of the distributer through wires 153 and 154. The "low" terminal point 122 of the controller is connected to the terminal point 79 of the distributer by wires 155 and 156. The "intermediate" terminal point 123 of the controller is connected to the "neutral" terminal point of the distributer by wires 157 and 152, while the high terminal point 124 of the controller is connected to neutral terminal point 77 of the distributer by wires 158 and 159. Referring to the terminal points on the governor, the terminal points 114 and 115 are connected to the magnet 40 through wire 160 and switch 41. The terminal point 113 is connected to the magnet 26 by a wire 161 and a wire 162. The terminal points 111 and 112 are connected to the magnet 25 by a wire 163. The "neutral" terminal point 110 of the governor is connected to the terminal points 84 and 85 of the distributer through wires 164 and 154. The "low" terminal point 109 of the governor is connected to the terminal point 79 of the distributer by wires 165 and 156. The "intermediate" terminal point 108 of the governor is connected to the terminal point 78 of the distributer through wires 166 and 152, while the high terminal point 107 of the governor is connected to the terminal point 77 of the distributer through wires 167 and 159. Referring to the distributer, the middle neutral terminal point 78 is connected to the "low" and "high" terminal points 80 and 81 by wires 168, while the terminal points 77 and 79 are connected to the terminal points 82 and 83 by wire 169. The terminal points 82 and 83 are themselves connected by a wire 170. The brush 86 of the distributer is connected to the magnet 71 on the side opposite the battery 140 by a wire 171. Having described the various mechanical and electrical features, I will now describe the operation of the various parts.

Mode of operation.

For the parts in the normal or neutral position, the operation is as follows: As before stated the device may be operated according to two different systems, first, an independently selective system and, second, an automatic system in which the gears are shifted commensurate with the speed of the car or automobile. The selective system will be described first and is as follows: This system is operated entirely by the controller and in selecting this system the switch 135 is placed in contact with the point 134. This permits the current to flow from the positive side of the battery 140 to the switch 135 through contact point 134 to the lever 130. If it is desired to move the transmission gears to a "reverse" position, the lever 130 is placed in contact with the contact point 120, in which case the current will flow in two directions from the lever 130, one direction being through the contact point 125, wire 150, wire 162, magnet 26 to the battery. When the magnet 26 is energized, its respective plunger 24 (Fig. 9) will be elevated, which will release its respective cam 21, thereby permitting the respective rack 11 to be shifted in a direction to place the "reverse" gears in mesh. At the same time that the magnet 26 is energized the current flowing through the wires 151 and 152, terminal point 78, brush 86, magnet 71, wire 144 to the negative side of the battery 140 energizes the magnet 71 which sets the clutch member 68 to clutch the gear 67 with the shaft 64. The clutch member 68 is so timed that the pinion 66 will therefore rotate the shaft 32 until the eccentric 27 makes a one-fourth revolution, at which time the eccentric will be disengaged from the gear 44 by the clutch member 45 actuated by the cam 55. When the eccentric makes the before-mentioned one-fourth revolution, the plate 17 will shift the rack 11 to the right as seen in Fig. 2, thereby oscillating the shaft 7 to set the reverse gear. The clutch member 68 is permitted to be connected to the gear 67 during this complete operation by the switch 59 which maintains the circuit through the magnet 71 after the brush 68 rides off the neutral contact points on the distributing plates 75. After the eccentric 27 has made a quarter revolution and the clutch member 45 is actuated, the gears 44 and 58 complete a half-revolution, at the end of which the current through the magnet 71 is broken at the switch 59, thereby bringing the parts to a dead stop. To return to the "neutral" position, the operation is as follows: The lever 130 is moved in contact with the neutral terminal 121.

The current will then flow from the positive side of the battery through switch 135, point 134, lever 130, point 121, wire 153, wire 154, point 85, brush 86, magnet 71 to the negative side of the battery 140. When the magnet 71 is thus energized the clutch member 68 is set, which permits the shaft 32 and eccentric 27 to revolve. The eccentric 27 makes one-fourth of a revolution when it is disengaged from the gear 44 by the clutch 45, the clutch 45 being actuated by the cam 55. During this quarter revolution the eccentric moves the shifting plate 17 to a neutral position which disengages or unmeshes the neutral gear in the transmission gear. When the brush 86 rides off the point 85 the circuit is maintained through the magnet 71 by the switch 59. After the eccentric has made its quarter revolution and has become disconnected the parts complete a one-half revolution, at the end of which the circuit is broken at the switch 59. To shift the gears to "low" the lever 130 is placed in contact with the terminal point 122. The operation in this case will be similar to that previously described with exception that the current will flow through wires 155 and 156 and terminal point 79. The eccentric will therefore make a one-fourth revolution which will shift the plate 17 to a position to place the low gears in mesh. To place the intermediate gears in mesh the lever 130 is placed in contact with the terminal point 123. The current will then flow through wires 157, 152, terminal point 78, terminal point 80, brush 86 to magnet 71. Magnet 71 being energized, the gear 44 starts to revolve. After the said gear has made a quarter revolution the cam 55 engages the lever 52 which shifts the yoke 50, thereby permitting the clutch member 45 to clutch the gear 44. During the continued movement the eccentric 27 is then revolved which shifts the plate 17 to the right, as shown in Fig. 2. When the brush 86 rides off the contact point 80 the circuit through the wire 56 is broken, but said circuit is maintained through the magnet 71 by the switch 59 as was before described. When the eccentric has made a quarter revolution and has brought the plate 17 to neutral, the circuit is broken at the switch 59 but has been reëstablished at the terminal point 78. The eccentric 27 then starts on its second quarter revolution which shifts the plate 17 to the extreme right. At the end of this second quarter revolution the cam 55 engages the lever 54, which places the yoke 50 in a position to disengage the clutch member 45, thereby disconnecting the eccentric. When the lever 130 was placed in contact with the point 123, current also flowed into the wire 149 through terminal point 127 which energized the magnet 25 and released the proper cam to permit the plate 17 to shift the intermediate gear rack 10. To place the "high" transmission gears in mesh, the lever 130 is placed in contact with the terminal point 124. The operation will be the same as that previously described with the exception that the current will flow through the wires 158 and 159 and terminal points 77 and 83. It is not contemplated that at any time the device will be used to accomplish a shift from intermediate to reverse or reverse to intermediate. To accomplish a shift from high to low directly or from low to high directly, the current in addition to flowing through the wires before mentioned will pass from the lever 130 to a terminal point 129 through a wire 148, switch 41, magnet 40, wire 142 to battery 140. When the magnet 40 was energized the eccentric 27 was disengaged from the shaft 32, which permitted the eccentric to fall after it had made a quarter revolution. The next quarter revolution will therefore move the eccentric back to its original position, but in the meantime the opposite magnet 25 or 26 has been energized, which releases the opposite cam and permits the opposite rack 10 or 11 to shift its respective shaft 6 or 7, thereby disengaging the low gear and setting the high gear, and vice versa. The device is operated entirely automatic through the agency of the governor. When this operation is desired, the switch 135 is placed in contact with the point 133. The current will then flow to the brush 102 and perform the same functions in the same manner as when it flows through lever 130, with exception that the brush 102 is automatically driven by a speed-controlled mechanism, while the lever 130 is manually actuated. It will be noted, however, that the governor is not provided with points capable of shifting the reverse gears, as this is always accomplished manually. The points 107, 108, 109, 110 are connected to the wires 152, 156, 154, 159, thereby eliminating the wires 151, 153, 155, 157 and 158 which lead to the manually actuated controller. It will therefore be seen that the operation as far as making and breaking the circuits are concerned are identical in both instances.

I claim as my invention:

1. The combination with an automobile, the engine, and the transmission gear thereof, of motion transmitting means actuated directly from said engine to shift said gear, and speed controlled means for said gear shifting means.

2. The combination with an automobile, the engine, and the transimission gear thereof, of shifting means for said gear, motion transmission means actuated directly by said engine for actuating said shifting means, and manual and speed controlled means controlling said shifting means.

3. The combination with an automobile, the engine and the transmission gear thereof, of shifting means for said gear, motion transmission means actuated directly by said engine for actuating said shifting means, manually and speed controlled means controlling said shifting means, and a selective switch for said manually and speed controlled means.

4. The combination with an automobile and the transmission gear thereof, of mechanical shifting means for said gear, electrical actuators for said mechanical shifting means, a distributer for said electrical actuators, and a controller for said distributer and actuators.

5. The combination with an automobile and the transmission gear thereof, of mechanical shifting means for said gear, electrical actuators for said shifting means, a distributer for said electrical actuators actuated by said shifting means, and a controller for said distributer and actuators.

6. The combination with an automobile and the transmission gear thereof, of mechanical shifting means for said gear, electrical actuators for said shifting means, a distributer for said electrical actuators actuated by said shifting means, and a manually and speed-actuated controller for said distributer and actuators.

7. The combination with an automobile and the transmission gear thereof, of mechanical shifting means for said gear, electrical actuators for said shifting means, a distributer for said electrical actuators actuated by said shifting means, a manually and speed-actuated controller for said distributer and actuators, and a selective switch for said controllers.

8. The combination with a transmission gear, of selective and mechanically-actuated shifting means for said gear, a clutch included in said shifting means, and electrical means controlling said clutch.

9. The combination with a transmission gear, of mechanically-actuated shifting means including cams and a clutch for said gear, and electrical controlling means for said cams and clutch.

10. The combination with a transmission gear, of mechanically-actuated shifting means including cams and a clutch for said gear, an electrical switch actuated by said shifting means, and electrical controlling means including said switch and controlling said cams and clutch.

11. The combination with a transmission gear, of mechanically-actuated shifting means including a continuously rotating eccentric having a shiftable center for said gear, and electrical means controlling said mechanical means.

12. The combination with a transmission gear, of mechanically-actuated shifting means including a continuously rotating shiftable eccentric for said gear, and electrical means controlling said mechanical means and said eccentric.

13. The combination with a transmission gear, of mechanically-actuated shifting means including cams, a clutch and a shiftable eccentric for said gear, and electrical means controlling said cams, clutch and eccentric.

14. The combination with a transmission gear, of mechanically-actuated shifting means including cams, a clutch and a shiftable eccentric, an electrical switch actuated by said shifting means, and electrical means including said switch controlling said cams, clutch and eccentric.

15. The combination with a transmission gear, of shifting means including a shiftable eccentric for said gear, a magnet controlling the shifting means of said eccentric, a switch controlling said magnet and actuated by said eccentric, and electrical means controlling said shifting means and said magnet.

16. The combination with a transmission gear, of shifting means for said gear including cams and a shiftable eccentric, a switch actuated by said shifting means, a second switch actuated by said eccentric, a magnet controlling the shifting of the eccentric and controlled by said second switch, and electrical means including said switch controlling said shifting means and said magnet.

17. The combination with a transmission gear, of shifting means for said gear including a switch, a clutch and a shiftable eccentric, magnets controlling said clutch and eccentric, a second switch actuated by said eccentric and controlling the magnet of the eccentric, and electrical means including said switches and controlling said shifting means and said magnets.

18. The combination with a transmission gear, of shifting means therefor including a switch, a mechanically-actuated clutch, an electrically-actuated clutch and a shiftable eccentric, a magnet controlling said eccentric, a second switch actuated by said eccentric and controlling the magnet of said eccentric, and electrical means including said switches and controlling said shifting means, said magnet, and said electrically-actuated clutch.

19. The combination with a transmission gear, of shifting means therefor, including cams, a switch, a mechanically-actuated clutch, an electrically-actuated clutch and a shiftable eccentric, a magnet controlling said eccentric, a switch actuated by said eccentric and controlling its magnet, and electrical means including said switches and controlling said cams, said magnets and said electrically-actuated clutches.

20. The combination with a transmission gear, of shifting means therefor, including cams, a switch, a mechanically-actuated clutch and a shiftable eccentric, magnets controlling said cams, a magnet controlling said eccentric, a switch actuated by said eccentric and controlling its magnet, and electrical means including said switches and controlling said magnets and said electrically-actuated clutch.

21. The combination with a transmission gear, of shifting means therefor, including cams, a switch, a mechanically-actuated clutch and a shiftable eccentric, magnets controlling said cams, a magnet controlling said eccentric, a switch actuated by said eccentric and controlling its magnet, electrical means including said switches controlling said magnets and said electrically-actuated clutch, and a distributer included in said electrical means actuated by said shifting means.

22. The combination with a transmission gear, of shifting means therefor, including cams, a switch, a mechanically-actuated clutch and a shiftable eccentric, magnets controlling said cams, a magnet controlling said eccentric, a switch actuated by said eccentric and controlling its magnet, electrical means including said switches and controlling said magnets and said electrically-actuated clutch, a distributer in said electrical means actuated by said shifting means, and a manually-actuated controller in said electrical means.

23. The combination with a transmission gear, of shifting means therefor, including cams, a switch, a mechanically-actuated clutch and a shiftable eccentric, magnets controlling said cams, a magnet controlling said eccentric, a switch actuated by said eccentric and controlling its magnet, electrical means including said switches and controlling said magnets and said electrically-actuated clutch, a distributer included in said electrical means actuated by said shifting means, and a speed-controlled governor in said electrical means.

24. A transmission gear and the rock shafts thereof, gears mounted on said rock shafts, racks in mesh with said gears, shiftable means adapted to be placed in engagement with said racks, cams controlling the movement of said shiftable means, an actuator for said shiftable means, and electrical means controlling said cams and said actuator.

25. A transmission gear and the rock shafts thereof, gears mounted on said rock shafts, racks in mesh with said gears, shiftable means adapted to be placed in engagement with said racks, cams controlling the movement of said shiftable means, an actuator for said shiftable means, electrical means controlling said cams and said actuator, and locking means for said cams.

26. A transmission gear and the rock shafts thereof, gears mounted on said rock shafts having recesses therein in mesh with said gears, a shiftable member adapted to be received by said recesses, cams controlling the movement of said shiftable member, an actuator for said member, and electrical means controlling said cams and said actuator.

27. The combination with an automobile, the service clutch and the transmission gear thereof, shifting means for said gear, speed control means for said shifting means, and a cam provided with a dwell portion adapted to actuate said service clutch whereby said transmission gears are adapted to come to speed before being placed in mesh.

28. The combination with an automobile, the engine, and the transmission gear thereof, of shifting means for said gear, a motion transmission means actuated directly by said engine for actuating said shifting means, manual and speed control means controlling said shifting means, and a switch adapted to select the manual or the speed control means.

29. The combination with an automobile, the engine, and the transmission gear thereof, of direct mechanical means actuated by said engine to shift said gear, and speed controlled means for said direct mechanical means, said speed controlled means being actuated from a forward wheel of the automobile.

In testimony whereof I affix my signature in presence of one witness.

HAROLD K. ALTICK.

Witness:
MATTHEW SIEBLER.